(12) United States Patent
Eoff et al.

(10) Patent No.: US 7,216,707 B2
(45) Date of Patent: May 15, 2007

(54) CEMENT COMPOSITIONS WITH IMPROVED FLUID LOSS CHARACTERISTICS AND METHODS OF CEMENTING USING SUCH CEMENT COMPOSITIONS

(75) Inventors: Larry S. Eoff, Duncan, OK (US); Eldon D. Dalrymple, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 383 days.

(21) Appl. No.: 10/872,997

(22) Filed: Jun. 21, 2004

(65) Prior Publication Data

US 2005/0279502 A1    Dec. 22, 2005

(51) Int. Cl.
*E21B 33/138* (2006.01)
(52) U.S. Cl. .................................................. 166/294
(58) Field of Classification Search ................ None
See application file for complete search history.

(56) References Cited

U.S. PATENT DOCUMENTS

| | | | | |
|---|---|---|---|---|
| 2,863,832 A | 12/1958 | Perrine | ...................... | 252/8.55 |
| 2,910,436 A | 10/1959 | Fatt et al. | .................. | 252/8.55 |
| 3,215,199 A | 11/1965 | Dilgren | ........................ | 166/38 |
| 3,251,415 A | 5/1966 | Bombardieri et al. | ......... | 166/42 |
| 3,297,090 A | 1/1967 | Dilgren | ........................ | 166/38 |
| 3,307,630 A | 3/1967 | Dilgren et al. | ................ | 166/38 |
| 3,382,924 A | 5/1968 | Veley et al. | ................... | 166/42 |
| 3,434,971 A | 3/1969 | Atkins | ........................ | 252/8.55 |
| 3,441,085 A | 4/1969 | Gidley | ........................ | 166/307 |
| 3,451,818 A | 6/1969 | Wareham | ........................ | 96/78 |
| 3,744,566 A | 7/1973 | Szabo et al. | ................. | 166/275 |
| 3,910,862 A | 10/1975 | Barabas et al. | ..... | 260/79.3 MU |
| 4,129,183 A | 12/1978 | Kalfoglou | ........................ | 166/300 |
| 4,142,595 A | 3/1979 | Anderson et al. | ............. | 175/72 |
| 4,152,274 A | 5/1979 | Phillips et al. | .............. | 876/296 |
| 4,158,521 A | 6/1979 | Anderson et al. | ........... | 405/264 |
| 4,158,726 A | 6/1979 | Kamada et al. | ............. | 526/200 |
| 4,299,710 A | 11/1981 | Dupre et al. | ............. | 252/8.5 A |
| 4,366,071 A | 12/1982 | McLaughlin et al. | .. | 252/8.55 R |
| 4,366,072 A | 12/1982 | McLaughlin et al. | .. | 252/8.55 R |
| 4,366,073 A | 12/1982 | McLaughlin et al. | .. | 252/8.55 R |
| 4,366,074 A | 12/1982 | McLaughlin et al. | .. | 252/8.55 R |
| 4,374,739 A | 2/1983 | McLaughlin et al. | .. | 252/8.55 R |
| 4,393,939 A | 7/1983 | Smith et al. | ................. | 166/293 |
| 4,395,340 A | 7/1983 | McLaughlin | ........... | 252/8.55 D |
| 4,401,789 A | 8/1983 | Gideon | ........................ | 524/827 |
| 4,439,334 A | 3/1984 | Borchardt | .............. | 252/8.55 D |
| 4,440,649 A | 4/1984 | Loftin et al. | ............. | 252/8.5 C |
| 4,447,342 A | 5/1984 | Borchardt et al. | ..... | 252/8.55 D |
| 4,460,627 A | 7/1984 | Weaver et al. | .............. | 427/212 |
| 4,462,718 A | 7/1984 | McLaughlin et al. | ....... | 405/264 |
| 4,532,052 A | 7/1985 | Weaver et al. | ......... | 252/8.55 R |
| 4,536,297 A | 8/1985 | Loftin et al. | ............. | 252/8.5 C |
| 4,536,303 A | 8/1985 | Borchardt | .............. | 252/8.55 R |
| 4,536,305 A | 8/1985 | Borchardt et al. | ..... | 252/8.55 R |
| 4,552,670 A | 11/1985 | Lipowski et al. | ........... | 704/553 |
| 4,554,081 A | 11/1985 | Borchardt et al. | ....... | 252/8.5 A |
| 4,563,292 A | 1/1986 | Borchardt | .............. | 252/8.55 R |
| 4,604,216 A | 8/1986 | Irvin et al. | .................. | 252/8.51 |
| 4,627,926 A | 12/1986 | Peiffer et al. | .......... | 252/8.55 R |
| 4,671,883 A | 6/1987 | Connell | .................... | 252/8.515 |
| 4,693,639 A | 9/1987 | Hollenbeak et al. | ........ | 405/263 |
| 4,699,722 A | 10/1987 | Dymond et al. | ......... | 252/8.551 |
| 4,730,028 A | 3/1988 | Bock et al. | .................. | 526/225 |
| 4,814,096 A | 3/1989 | Evani | ....................... | 252/8.554 |
| 4,828,726 A | 5/1989 | Himes et al. | ............. | 252/8.553 |
| 4,959,432 A | 9/1990 | Fan et al. | .................... | 526/287 |
| 5,071,934 A | 12/1991 | Peiffer | ........................ | 526/307 |
| 5,097,904 A | 3/1992 | Himes | ........................ | 166/294 |

(Continued)

FOREIGN PATENT DOCUMENTS

DE    2 250 552    4/1974

(Continued)

OTHER PUBLICATIONS

Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2, printed from website @ http://speonline.spe.org/cgi-bin/viewpaper.cqi?paper=00068973.pdf.

(Continued)

*Primary Examiner*—Zakiya W. Bates
(74) *Attorney, Agent, or Firm*—Robert A. Kent; Baker Botts

(57) ABSTRACT

The present invention provides a method of cementing in a subterranean formation that includes providing a cement composition that includes water, cement, and a fluid loss control additive that includes a water-soluble hydrophobically modified polymer or a hydrophilically modified water-soluble polymer; placing the cement composition into the subterranean formation; and allowing the cement composition to set therein. In certain embodiments, the water-soluble hydrophobically modified polymer or the hydrophilically modified water-soluble polymer may include a polymer backbone that comprises polar heteroatoms. In another embodiment, the water-soluble hydrophobically modified polymer may be a reaction product of a hydrophobic compound with a polyvinylamine, a poly(vinylamine/vinyl alcohol), or an alkyl acrylate polymer.

18 Claims, No Drawings

U.S. PATENT DOCUMENTS

| | | | |
|---|---|---|---|
| 5,146,986 A | 9/1992 | Dalrymple | 166/294 |
| 5,160,642 A | 11/1992 | Schield et al. | 252/8.551 |
| 5,197,544 A | 3/1993 | Himes | 166/294 |
| 5,208,216 A | 5/1993 | Williamson et al. | 507/120 |
| 5,244,042 A | 9/1993 | Dovan et al. | 166/270 |
| 5,271,466 A | 12/1993 | Harms | 166/300 |
| 5,342,530 A | 8/1994 | Aften et al. | 252/8.551 |
| 5,379,841 A | 1/1995 | Pusch et al. | 166/295 |
| 5,382,371 A | 1/1995 | Stahl et al. | 507/221 |
| 5,597,783 A | 1/1997 | Audibert et al. | 507/120 |
| 5,607,902 A | 3/1997 | Smith et al. | 507/120 |
| 5,637,556 A | 6/1997 | Argillier et al. | 507/120 |
| 5,646,093 A | 7/1997 | Dino | 507/209 |
| 5,669,456 A | 9/1997 | Audibert et al. | 175/72 |
| 5,720,347 A | 2/1998 | Audibert et al. | 166/294 |
| 5,728,653 A | 3/1998 | Audibert et al. | 507/222 |
| 5,735,349 A | 4/1998 | Dawson et al. | 166/295 |
| 5,887,653 A | 3/1999 | Bishop et al. | 166/281 |
| 5,944,106 A | 8/1999 | Dalrymple et al. | 166/281 |
| 5,972,848 A | 10/1999 | Audibert et al. | 507/119 |
| 5,979,557 A | 11/1999 | Card et al. | 166/300 |
| 6,020,289 A | 2/2000 | Dymond | 507/120 |
| 6,070,664 A | 6/2000 | Dalrymple et al. | 166/281 |
| 6,124,245 A | 9/2000 | Patel | 507/120 |
| 6,187,839 B1 | 2/2001 | Eoff et al. | 523/130 |
| 6,228,812 B1 | 5/2001 | Dawson et al. | 507/221 |
| 6,237,687 B1 | 5/2001 | Barbee, Jr. et al. | 166/278 |
| 6,253,851 B1 | 7/2001 | Schroeder, Jr. et al. | 166/278 |
| 6,277,900 B1 | 8/2001 | Oswald et al. | 523/130 |
| 6,283,210 B1 | 9/2001 | Soliman et al. | 166/270 |
| 6,359,047 B1 | 3/2002 | Thieu et al. | 524/376 |
| 6,364,016 B1 | 4/2002 | Dalrymple et al. | 166/270 |
| 6,380,137 B1 | 4/2002 | Heier et al. | 507/121 |
| 6,441,102 B2 * | 8/2002 | Akasaki et al. | 525/404 |
| 6,476,169 B1 | 11/2002 | Eoff et al. | 523/307.2 |
| 6,476,283 B1 | 11/2002 | Devore et al. | 585/250 |
| 6,497,283 B1 | 12/2002 | Eoff et al. | 166/293 |
| 6,516,885 B1 | 2/2003 | Munday | 166/295 |
| 6,569,983 B1 | 5/2003 | Treybig et al. | 528/102 |
| 6,609,578 B2 | 8/2003 | Patel et al. | 175/64 |
| 6,627,719 B2 | 9/2003 | Whipple et al. | 774/325 |
| 6,710,107 B2 | 3/2004 | Audibert et al. | 524/5 |
| 6,787,506 B2 | 9/2004 | Blair et al. | 507/222 |
| 6,803,348 B2 | 10/2004 | Jones et al. | 507/221 |
| 6,855,672 B2 | 2/2005 | Poelker et al. | 507/225 |
| 7,091,159 B2 | 8/2006 | Eoff et al. | 507/120 |
| 2003/0019627 A1 | 1/2003 | Qu et al. | 166/281 |
| 2003/0104948 A1 | 6/2003 | Poelker et al. | 507/100 |
| 2003/0191030 A1 | 10/2003 | Blair et al. | 507/225 |
| 2004/0102331 A1 | 5/2004 | Chan et al. | 507/100 |
| 2004/0171495 A1 | 9/2004 | Zamora et al. | 507/100 |
| 2004/0220058 A1 | 11/2004 | Eoff et al. | 507/200 |
| 2004/0229756 A1 | 11/2004 | Eoff et al. | 507/200 |
| 2004/0229757 A1 | 11/2004 | Eoff et al. | 507/219 |
| 2005/0230116 A1 | 10/2005 | Nguyen et al. | |

FOREIGN PATENT DOCUMENTS

| | | |
|---|---|---|
| EP | 0 383 337 A2 | 8/1990 |
| EP | 0 896 122 A2 | 2/1999 |
| EP | 1 033 378 A1 | 9/2000 |
| EP | 1 193 365 A1 | 4/2002 |
| EP | 1 312 753 A1 | 5/2003 |
| GB | 2 221 940 A | 2/1990 |
| GB | 2335428 A | 9/1999 |
| WO | WO 93/15164 | 8/1993 |
| WO | WO 99/49183 | 9/1999 |
| WO | WO 99/50530 | 10/1999 |
| WO | WO 00/78890 | 12/2000 |
| WO | WO 02/097236 A1 | 12/2002 |
| WO | WO 2003/056130 | 7/2003 |
| WO | WO 2004/094781 | 11/2004 |
| WO | WO 2004/101706 A1 | 11/2004 |

OTHER PUBLICATIONS

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston TX, Feb. 13-16, pp. 1-2, printed from website @ http://speonline.spe.org/cgi-bin/viewpaper.cqi?paper=00064985.pdf.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.

Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esqnws_053101.jsp?printMe.

Halliburton, 2001 Press Releases, *First Halliburton H2Zero™ Conformance Solution Job Performed for a Producing Well in Egypt*, 2002 Halliburton, pp. 1-2, pritned from website @ www.halliburton.com/news/archive/2001/esqnws_111901.jsp.

Halliburton, 2001 Press Releases, *Halliburton Performs First H2Zero™ Conformance Solution Job in North America*, 2002 Halliburton, pp. 1-2, printed from website @ www.halliburton.com/news/archive/2001/esqnws_082201.jsp.

BJ Services Company, *Aquacon, Product Information*, Aug. 1, 2001, pp. 1-2.

BJ Services Company, *Aquatrol I, Product Information*, Dec. 14, 2000, pp. 1-2.

Botermans, C. Wouter, et al, *Relative Permeability Modifiers: Myth or Reality?*, SPE No. 68973, 2001, Society of Petroleum Engineers, Inc., presented at SPE European Formation Damage Conference, The Hague, The Netherlands, May 21-22, pp. 1-13 (previously listed as website address, SPE eLibrary).

Eoff, Larry, et al, *Structure and Process Optimization for the Use of a Polymeric Relative-Permeability Modifier in Conformance Control*, SPE No. 64985, 2001, Society of Petroleum Engineers, Inc., presented at SPE International Symposium on Oilfield Chemistry, Houston, TX, Feb. 13-16, pp. 1-14 (previously listed as website address, SPE eLibrary).

Xu, et al.., Modeling of Laser Spallation Drilling of Rocks for Gas-and Oilwell Drilling, SPE 95746, 2005.

Gahan, et al., Effect of Downhole Pressure Conditions on High-Power Laser Perforation, SPE 97093, 2005.

Gahan, et al., Analysis of Efficient High-Power Fiber Lasers of Well Perforation, SPE 90661, 2004.

Parker, et al., Well Perforation Using High-Power Lasers, SPE 84418, 2003.

Parker, et al., Laser Drilling: Effects of Beam Application Methods on Improving Rock Removal, SPE 84353, 2003.

Bai, et al., Improved Determination of Stree-Dependent Permeability for Anisotropic Formations, SPE 78188, 2002.

Proett, et al., Advanced Permeability and Anisotropy Measurements While Testing and Sampling in Real-Time Using a Dual Probe Formation Tester, SPE 62919, 2000.

Proett, et al., Advanced Dual Probe Formation Tester With Transient, Harmonic, and Pulsed Time-Delay Testing Methods Determines Permeability, Skin and Anisotropy, SPE 64650, 2000.

* cited by examiner

CEMENT COMPOSITIONS WITH IMPROVED FLUID LOSS CHARACTERISTICS AND METHODS OF CEMENTING USING SUCH CEMENT COMPOSITIONS

BACKGROUND OF THE INVENTION

The present invention relates to cementing operations. More particularly, the present invention relates to cement compositions comprising improved fluid loss control additives, and methods of using such cement compositions.

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of the pipe string disposed therein. The cement composition is permitted to set in the annular space, thereby forming an annular sheath of hardened substantially impermeable cement therein that substantially supports and positions the pipe string in the well bore and bonds the exterior surface of the pipe string to the walls of the well bore. Hydraulic cement compositions also are used in remedial cementing operations such as plugging highly permeable zones or fractures in well bores, plugging cracks and holes in pipe strings, and the like.

In some cases, subterranean formations may be unable to withstand the hydrostatic head pressure normally associated with fluids (e.g., cement compositions and the like) being injected into the formation. In such cases, the hydrostatic pressure may be sufficient to force such fluids into the permeable zones of the formation, which may result in a significant loss of fluid into the formation. This fluid loss into the formation is problematic for a number of reasons. For example, where the fluid loss occurs during a cementing operation, excessive fluid loss may cause a cement composition to be prematurely dehydrated, which may limit the amount of the cement composition that can be pumped and decrease the compressive strength of the cement composition. Excessive fluid loss into the formation also may prevent or reduce bond strength between the set cement composition and the subterranean zone, the walls of pipe, and/or the walls of the well bore.

In order to counteract these problems, fluid loss control additives may be added to cement compositions to reduce the loss of fluid from the cement compositions when they contact permeable zones of the subterranean formation. Fluid loss control additives also may be suitable for cement compositions used in surface cementing operations. Conventional synthetic fluid loss control additives may be high molecular weight, water-soluble polymers, such as copolymers and copolymer salts of N,N-dimethylacrylamide and 2-acrylamido-2-methylpropane sulfonic acid. While these conventional fluid loss control additives have been used with some success, there is a continuing need for improved fluid loss control additives that achieve fluid loss control in well cement compositions.

SUMMARY OF THE INVENTION

The present invention relates to cementing operations. More particularly, the present invention relates to cement compositions comprising improved fluid loss control additives, and methods of using such cement compositions.

In one embodiment, the present invention provides a method of cementing in a subterranean formation comprising: providing a cement composition that comprises water, cement, and a fluid loss control additive that comprises a water-soluble hydrophobically modified polymer that comprises a polymer backbone comprising polar heteroatoms; placing the cement composition into the subterranean formation; and allowing the cement composition to set therein.

In another embodiment, the present invention provides a method of cementing in a subterranean formation comprising: providing a cement composition that comprises water, cement, and a fluid loss control additive that comprises a water-soluble hydrophobically modified polymer that is a reaction product of a hydrophobic compound with a polyvinylamine, a poly(vinylamine/vinyl alcohol), or an alkyl acrylate polymer; placing the cement composition into the subterranean formation; and allowing the cement composition to set therein.

In another embodiment, the present invention provides a method of cementing in a subterranean formation comprising: providing a cement composition that comprises water, cement, and a fluid loss control additive that comprises a hydrophilically modified water-soluble polymer; placing the cement composition into the subterranean formation; and allowing the cement composition to set therein.

In another embodiment, the present invention provides a cement composition that comprises water, cement, and a fluid loss control additive that comprises a water-soluble hydrophobically modified polymer that comprises a polymer backbone comprising polar heteroatoms.

In another embodiment, the present invention provides a cement composition that comprises water, cement, and a fluid loss control additive comprising a water-soluble hydrophobically modified polymer that is a reaction product of a hydrophobic compound with a polyvinylamine, a poly(vinylamine/vinyl alcohol), or an alkyl acrylate polymer.

In yet another embodiment, the present invention provides a cement composition that comprises water, cement, and a fluid loss control additive that comprises a hydrophilically modified water-soluble polymer.

The features and advantages of the present invention will be readily apparent to those skilled in the art upon a reading of the description of the exemplary embodiments which follows

DESCRIPTION OF EXEMPLARY EMBODIMENTS

The present invention relates to cementing operations. More particularly, the present invention relates to cement compositions comprising improved fluid loss control additives, and methods of using such cement compositions. While the compositions and methods of the present invention are useful in a variety of applications, they are particularly useful for subterranean well completion and remedial operations, such as primary cementing, e.g., cementing casings and liners in well bores, including those in production wells, which include multi-lateral subterranean wells. They are also useful for surface cementing operations, such as construction cementing.

The cement compositions of the present invention generally comprise water, cement, and a fluid loss control additive of the present invention. A wide variety of other additives optionally may be included in the cement compositions of the present invention if desired. Generally, the cement compositions of the present invention may have a density in the range of from about 5 lb/gallon to about 30 lb/gallon. The cement compositions of the present invention may be foamed or unfoamed or may comprise other means to reduce their densities. One of ordinary skill in the art, with the benefit of this disclosure, will recognize the appropriate density of the cement composition for a chosen application.

The water utilized in the cement compositions of the present invention can be fresh water, salt water (e.g., water containing one or more salts dissolved therein), brine (e.g., saturated salt water), or seawater. Generally, the water can be from any source provided that it does not contain an excess of compounds, e.g., dissolved organics, that may adversely affect other components in the cement composition. Further, water may be present in an amount sufficient to make the cement composition a pumpable slurry. In certain exemplary embodiments, water is present in the cement compositions in an amount in the range of from about 30% to about 200% by weight of the cement ("bwoc") therein. One of ordinary skill in the art with the benefit of this disclosure will recognize the appropriate amount of water to use for a chosen application.

Any cement suitable for use in subterranean applications is suitable for use in the present invention. In one embodiment, the cement compositions of the present invention comprise hydraulic cement. A variety of hydraulic cements are suitable for use, including those comprised of calcium, aluminum, silicon, oxygen, and/or sulfur, which set and harden by reaction with water. Such hydraulic cements include, but are not limited to, Portland cements, pozzolanic cements, gypsum cements, soil cements, calcium phosphate cements, high alumina content cements, silica cements, high alkalinity cements, and mixtures thereof.

Generally, the fluid loss control additives of the present invention comprise water-soluble hydrophobically modified polymers or hydrophilically modified water-soluble polymers. As used herein, "hydrophobically modified" refers to the incorporation into the hydrophilic polymer structure of hydrophobic groups, wherein the alkyl chain length is from about 4 to about 22 carbons. As used herein, "hydrophilically modified" refers to the incorporation into the hydrophilic polymer structure of hydrophilic groups. As used herein, "water-soluble" refers to at least 0.01 weight percent soluble in distilled water. Among other things, the fluid loss control additives of the present invention may act to reduce the fluid loss from the cement compositions therein.

The water-soluble hydrophobically modified polymers of the fluid loss control additives of the present invention typically have a molecular weight in the range of from about 100,000 to about 10,000,000. In an exemplary embodiment, the water-soluble hydrophobically modified polymers may comprise a polymer backbone that comprises polar heteroatoms. Generally, the polar heteroatoms present within the polymer backbone of the water-soluble hydrophobically modified polymers include, but are not limited to, oxygen, nitrogen, sulfur, or phosphorous.

In certain embodiments of the present invention, the water-soluble hydrophobically modified polymers may be a reaction product of a hydrophilic polymer and a hydrophobic compound. The hydrophilic polymers suitable for forming the water-soluble hydrophobically modified polymers used in the present invention should be capable of reacting with hydrophobic compounds. Suitable hydrophilic polymers include, homo-, co-, or terpolymers such as, but not limited to, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(acrylamide/dimethylaminopropyl methacrylamide), poly(2-acrylamido-2-methyl propane sulfonic acid/dimethylaminoethyl methacrylate), poly (acrylic acid/dimethylaminopropyl methacrylamide), and poly(methacrylic acid/dimethylaminopropyl methacrylamide). In certain embodiments, the hydrophilic polymers contain reactive amino groups in the polymer backbone or as pendant groups, which are capable of reacting with hydrophobic compounds. In an exemplary embodiment, the hydrophilic polymers comprise dialkyl amino pendant groups. In an exemplary embodiment, the hydrophilic polymers comprise a dimethyl amino pendant group and at least one monomer comprising dimethylaminoethyl methacrylate or dimethylaminopropyl methacrylamide. In certain exemplary embodiments of the present invention, the hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers comprising polar heteroatoms within the polymer backbone include homo-, co-, or terpolymers, such as, but not limited to, celluloses, polyamides, polyetheramines, polyethyleneimines, polyhydroxyetheramines, polylysines, polysulfones, gums, and starches. In an exemplary embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, and organic acid derivatives. Examples of suitable organic acid derivatives include, but are not limited to, octenyl succinic acid; dodecenyl succinic acid; and anhydrides, esters, and amides of octenyl succinic acid or dodecenyl succinic acid. In certain exemplary embodiments, the hydrophobic compounds may have an alkyl chain length of from about 4 to about 22 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

In another embodiment of the present invention, the fluid loss control additives of the present invention comprise a hydrophilically modified water-soluble polymer. The hydrophilically modified water-soluble polymers used in the present invention typically have a molecular weight in the range of from about 100,000 to about 10,000,000. In an exemplary embodiment, the hydrophilically modified water-soluble polymers comprise a polymer backbone that comprises polar heteroatoms. Generally, the polar heteroatoms present within the polymer backbone of the hydrophilically modified water-soluble polymers include, but are not limited to, oxygen, nitrogen, sulfur, or phosphorous.

In certain embodiments of the present invention, the hydrophilically modified water-soluble polymers may be a reaction product of a water-soluble hydrophilic polymer and a hydrophilic compound. The water-soluble hydrophilic polymers suitable for forming the hydrophilically modified water-soluble polymers used in the present invention should be capable of reacting with hydrophilic compounds. In certain exemplary embodiments, suitable hydrophilic polymers include, homo-, co-, or terpolymers, such as, but not limited to, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). In certain embodiments, the water-soluble hydrophilic polymers contain reactive amino groups in the polymer backbone or as pendant groups, which are capable of reacting with hydrophilic compounds. In an exemplary embodiment, the water-soluble hydrophilic polymers comprise dialkyl amino pendant groups. In an exemplary embodiment, the water-soluble hydrophilic polymers comprise a dimethyl amino pendant group and at least one monomer comprising dimethylaminoethyl methacrylate or dimethylaminopropyl methacrylamide. In another exemplary embodiment of the present invention, the water-soluble hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers comprising polar heteroatoms within the polymer backbone include homo-, co-, or terpolymers such as, but not limited to, celluloses, polyamides, polyetheramines, polyethyleneimines, polyhydroxyetheramines, polylysines, polysulfones, gums, and starches. In an exemplary embodiment the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the water-soluble hydrophilic polymers include, but are not limited to, polyethers comprising halogen, sulfonates, sulfates, and organic acid derivatives. Examples of suitable polyethers include, but are not limited to, polyethylene oxides, polypropylene oxides, polybutylene oxides, and mixtures thereof. In an exemplary embodiment, the polyether comprises an epichlorohydrin terminated polyethylene oxide methyl ether.

The hydrophilically modified water-soluble polymers formed from the reaction of a water-soluble hydrophilic polymer with a hydrophilic compound may have estimated molecular weights in the range of from about 100,000 to about 10,000,000 and may have weight ratios of the water-soluble hydrophilic polymers to the polyethers in the range of from about 1:1 to about 10:1. Suitable hydrophilically modified water-soluble polymers having molecular weights and weight ratios in the ranges set forth above include, but are not limited to, the reaction product of polydimethylaminoethyl methacrylate with epichlorohydrin terminated polyethyleneoxide methyl ether; the reaction product of polydimethylaminopropyl methacrylamide with epichlorohydrin terminated polyethyleneoxide methyl ether; and the reaction product of poly(acrylamide/dimethylaminopropyl methacrylamide) with epichlorohydrin terminated polyethyleneoxide methyl ether. In an exemplary embodiment, the hydrophilically modified water-soluble polymers comprise the reaction product of a polydimethylaminoethyl methacrylate with epichlorohydrin terminated polyethyleneoxide methyl ether having a weight ratio of polydimethylaminoethyl methacrylate to epichlorohydrin terminated polyethyleneoxide methyl ether of 3:1.

The fluid loss control additives of the present invention should be present in the cement compositions of the present invention in an amount sufficient to provide the desired degree of fluid loss control. In an exemplary embodiment, the fluid loss control additive of the present invention is present in the cement compositions of the present invention in an amount in the range of from about 0.1% to about 4% bwoc.

Additional additives may be added to the cement compositions of the present invention as deemed appropriate by one skilled in the art with the benefit of this disclosure. Examples of such additives include, but are not limited to, fly ash, silica compounds, surfactants, dispersants, accelerators, retarders, salts, micas, fibers, formation conditioning agents, fumed silica, expanding additives, weighting materials, defoamers, lightweight additives (e.g., bentonite, microspheres, and sodium silicate), and the like.

In one embodiment, the present invention provides a method of cementing in a subterranean formation comprising: providing a cement composition that comprises water, cement, and a fluid loss control additive that comprises a water-soluble hydrophobically modified polymer that comprises a polymer backbone comprising polar heteroatoms; placing the cement composition into the subterranean formation; and allowing the cement composition to set therein.

In another embodiment, the present invention provides a method of cementing in a subterranean formation comprising: providing a cement composition that comprises water, cement, and a fluid loss control additive that comprises a water-soluble hydrophobically modified polymer that is a reaction product of a hydrophobic compound with a polyvinylamine, a poly(vinylamine/vinyl alcohol), or an alkyl acrylate polymer; placing the cement composition into the subterranean formation; and allowing the cement composition to set therein.

In another embodiment, the present invention provides a method of cementing in a subterranean formation comprising: providing a cement composition that comprises water, cement, and a fluid loss control additive that comprises a hydrophilically modified water-soluble polymer; placing the cement composition into the subterranean formation; and allowing the cement composition to set therein.

In another embodiment, the present invention provides a cement composition that comprises water, cement, and a fluid loss control additive that comprises a water-soluble hydrophobically modified polymer that comprises a polymer backbone comprising polar heteroatoms.

In another embodiment, the present invention provides a cement composition that comprises water, cement, and a fluid loss control additive that comprises a water-soluble hydrophobically modified polymer that is a reaction product of a hydrophobic compound with a polyvinylamine, a poly(vinylamine/vinyl alcohol), or an alkyl acrylate polymer.

In yet another embodiment, the present invention provides a cement composition that comprises water, cement, and a fluid loss control additive that comprises a hydrophilically modified water-soluble polymer.

To facilitate a better understanding of the present invention, the following examples of the preferred embodiments are given. In no way should the following examples be read to limit, or define, the scope of the invention.

EXAMPLES

Sample compositions were prepared by mixing a cement slurry with a fluid loss control additive. The sample cement compositions were tested for fluid loss in accordance with the procedure described in *Recommended Practice for Testing Well Cements*, API Recommended Practice 10B, 22nd Edition, dated December, 1997. The fluid loss tests were performed at 80° F.

Sample Composition No. 1 (comparative) comprises Portland Class H cement, 38% of fresh water bwoc, and 1% of polyethyleneimine ("PEI") bwoc. The fluid loss was found to be 48 milliliters ("ml") in 0.3 minutes.

Sample Composition No. 2 comprises Portland Class H cement, 38% of fresh water bwoc, and 1% of a water-soluble hydrophobically modified polymer bwoc. The water-soluble hydrophobically modified polymer used in Sample Composition No. 2 was PEI hydrophobically modified with hexadecyl bromide ("$C_{16}Br$"), wherein the water-soluble hydrophobically modified polymer comprises 5.7% $C_{16}Br$ by weight. The fluid loss was found to be 49 ml in 5.4 minutes.

Sample Composition No. 3 comprises Portland Class H cement, 38% of fresh water bwoc, and 1% of a water-soluble hydrophobically modified polymer bwoc. The water-soluble hydrophobically modified polymer used in Sample Composition No. 3 was PEI hydrophobically modified with $C_{16}Br$, wherein the water-soluble hydrophobically modified polymer comprises 15.3% $C_{16}Br$ by weight. The fluid loss was found to be 52 ml in 9.7 minutes.

Sample Composition No. 4 (comparative) comprises Portland Class H cement, 47% of fresh water bwoc, and 1% of poly(dimethylaminoethyl methacrylate) ("PDMAEMA"). The fluid loss was found to be 47 ml in 0.75 minutes.

Sample Composition No. 5 comprises Portland Class H cement, 63% of fresh water bwoc, and 1% of a water-soluble hydrophobically modified polymer bwoc. The water-soluble hydrophobically modified polymer used in Sample Composition No. 5 was PDMAEMA hydrophobically modified with $C_{16}Br$, wherein the water-soluble hydrophobically modified polymer comprises 9.2% $C_{16}Br$ by weight. The fluid loss was found to be 38 ml in 29.5 minutes.

A summary of the fluid loss demonstrated by each of the samples is depicted in Table 1, below.

TABLE 1

| Fluid | Fluid Loss Control Additive | % $C_{16}Br$ in the modified polymer | Fluid Loss (ml/minutes) |
|---|---|---|---|
| Sample Composition No. 1 | PEI | 0 | 48/0.3 |
| Sample Composition No. 2 | PEI modified with $C_{16}Br$ | 5.7 | 49/5.4 |
| Sample Composition No. 3 | PEI modified with $C_{16}Br$ | 15.3 | 52/9.7 |
| Sample Composition No. 4 | PDMAEMA | 0 | 47/0.75 |
| Sample Composition No. 5 | PDMAEMA modified with $C_{16}Br$ | 9.2 | 38/29.5 |

Thus, the Example demonstrates, inter alia, that hydrophobic modification improves the fluid loss control characteristics of a polymer.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing in a subterranean formation comprising the steps of:
    providing a cement composition that comprises:
        water,
        cement, and
        a fluid loss control additive comprising a water-soluble hydrophobically modified polymer that comprises a polymer backbone comprising polar heteroatoms;
    placing the cement composition into the subterranean formation; and
    allowing the cement composition to set therein.

2. The method of claim 1 wherein the water is present in the cement composition in an amount in the range of from about 30% to about 200% by weight of the cement.

3. The method of claim 1 wherein the fluid loss control additive is present in the cement composition in an amount in the range of from about 0.1% to about 4% by weight of the cement.

4. The method of claim 1 wherein the water-soluble hydrophobically modified polymer has a molecular weight in the range of from about 100,000 to about 10,000,000.

5. The method of claim 1 wherein at least one of the polar heteroatoms is selected from the group consisting of: oxygen, nitrogen, sulfur, and phosphorous.

6. The method of claim 1 wherein the water-soluble hydrophobically modified polymer is a reaction product of hydrophobic compound and a hydrophilic polymer that comprises a polymer backbone comprising polar heteroatoms.

7. The method of claim 6 wherein the hydrophilic polymer is selected from the group consisting of: a cellulose, a polyamide, a polyetheramine, a polyethyleneimine, a polyhydroxyetheramine, a polylysine, a polysulfone, a gum, and a starch.

8. The method of claim 6 wherein the hydrophobic compound is selected from the group consisting of: an alkyl halide, a sulfonate, a sulfate, and an organic acid derivative.

9. The method of claim 8 wherein the organic acid derivative is selected from the group consisting of: an octenyl succinic acid; a dodecenyl succinic acid; and an anhydride, ester, or amide of octenyl succinic acid or dodecenyl succinic acid.

10. The method of claim 6 wherein the hydrophobic compound has an alkyl chain length of from about 4 to about 22 carbons.

11. A method of cementing in a subterranean formation comprising:
    providing a cement composition that comprises:
        water,
        cement, and
        a fluid loss control additive comprising a water-soluble hydrophobically modified polymer that is a reaction product of a hydrophobic compound with a polymer comprising a reactive amino group;
    placing the cement composition into the subterranean formation; and
    allowing the cement composition to set therein.

12. The method of claim 11 wherein the water is present in the cement composition in an amount in the range of from about 30% to about 200% by weight of the cement.

13. The method of claim 11 wherein the fluid loss control additive is present in the cement composition in an amount in the range of from about 0.1% to about 4% by weight of the cement.

14. The method of claim 11 wherein the water-soluble hydrophobically modified polymer has a molecular weight in the range of from about 100,000 to about 10,000,000.

15. The method of claim 11 wherein the polymer comprising a reactive amino group is selected from the group consisting of: polydimethylaminoethyl methacrylate, polydimethylaminopropyl methacrylamide, poly(acrylamide/dimethylaminoethyl methacrylate), poly(acrylic acid/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide).

16. The method of claim 11 wherein the hydrophobic compound is selected from the group consisting of: an alkyl halide, a sulfonate, a sulfate, and an organic acid derivative.

17. The method of claim 16 wherein the organic acid derivative is selected from the group consisting of: an octenyl succinic acid; a dodecenyl succinic acid; and an anhydride, ester, or amide of octenyl succinic acid or dodecenyl succinic acid.

18. The method of claim 11 wherein the hydrophobic compound has an alkyl chain length of from about 4 to about 22 carbons.

* * * * *